United States Patent [19]
Fukui

[11] Patent Number: 5,423,663
[45] Date of Patent: Jun. 13, 1995

[54] ORBITING MEMBER FLUID DISPLACEMENT APPARATUS WITH ROTATION PREVENTING MECHANISM

[75] Inventor: Tsuyoshi Fukui, Isesaki, Japan

[73] Assignee: Sanden Corporation, Isesaki, Japan

[21] Appl. No.: 163,748

[22] Filed: Dec. 7, 1993

[30] Foreign Application Priority Data

Dec. 7, 1992 [JP] Japan .................... 4-090004 U

[51] Int. Cl.⁶ .................... F01C 1/04; F01C 21/02; F01C 21/04; F16D 3/04
[52] U.S. Cl. .................... 418/55.3; 418/55.6; 464/7; 464/103
[58] Field of Search ........... 418/55.3, 55.6; 464/7, 464/15, 102, 103

[56] References Cited
U.S. PATENT DOCUMENTS

| | | | |
|---|---|---|---|
| 3,924,977 | 12/1975 | McCullough | 418/57 |
| 3,986,799 | 10/1976 | McCullough | 418/57 |
| 3,994,633 | 11/1976 | Shaffer | 418/57 |
| 4,160,629 | 7/1979 | Hidden et al. | 418/55.3 |
| 4,259,043 | 3/1981 | Hidden et al. | 418/55.3 |
| 4,340,339 | 7/1982 | Hiraga et al. | 418/55.6 |
| 4,406,600 | 9/1983 | Terauchi et al. | 418/55.3 |
| 4,527,963 | 7/1985 | Terauchi | 418/55.6 |
| 4,934,909 | 6/1990 | Suzuki et al. | 418/55.6 |
| 5,102,315 | 4/1992 | Terauchi et al. | 418/55.3 |
| 5,141,422 | 8/1992 | Ito et al. | 418/55.3 |
| 5,221,198 | 6/1993 | Izumi et al. | 418/55.3 |

Primary Examiner—John J. Vrablik
Attorney, Agent, or Firm—Baker & Botts

[57] ABSTRACT

The present invention discloses an orbiting member fluid displacement apparatus including a rotation preventing and thrust bearing device. The rotation preventing and thrust bearing device includes a fixed portion, an orbital portion, and bearing elements. The fixed portion includes a first annular race and a first ring, which are formed separately. The first annular race is placed in a loose fit within a first annular step in an inner surface of the housing and the first ring is attached to the housing. The orbital portion includes a second annular race and a second ring, which also are formed separately. The second annular race is placed in a loose fit within a second annular step in an end plate of the orbiting member and the second ring is attached to the end plate of the orbiting member. A plurality of pockets are formed in the rings and face one another in substantially aligned pairs. A bearing element is received in each aligned pair of pockets to prevent the rotation of the orbiting member by the bearing elements interacting with the first and second rings and to bear the axial thrust load from the orbiting member. One or more lubricant conductive grooves are formed at first contacting surfaces between the first annular race and the housing or second contacting surfaces between the second annular race and the orbiting member, or both.

38 Claims, 12 Drawing Sheets

ORBITING MEMBER FLUID DISPLACEMENT APPARATUS WITH ROTATION PREVENTING MECHANISM

BACKGROUND OF THE INVENTION

1. Field Of The Invention

This invention relates to a rotary fluid displacement apparatus and more particularly, to an improvement in a rotation preventing and thrust bearing device for an orbiting member fluid displacement apparatus.

2. Description Of The Prior Art

There are several types of fluid apparatus which utilize an orbiting piston or fluid displacing member, such as the scroll-type fluid displacement apparatus disclosed in U.S. Pat. No. 801,182 to Creux.

The scroll-type fluid displacement apparatus disclosed in this U.S. patent includes two scrolls each having a circular end plate and a spiroidal or involute spiral element. These scrolls are maintained angularly and radially offset, so that both spiral elements interfit to create a plurality of line contacts between their spiral curved surfaces and thereby to seal off and define at least one pair of fluid pockets. The relative orbital motion of the two scrolls shifts the line contacts along the spiral curved surfaces, and as a result, the volume of the fluid pockets changes. Because the volume of the fluid pockets increases or decreases dependent on the direction of the orbiting motion, the scroll-type fluid displacement apparatus is capable of compressing, expanding, or pumping fluids.

Generally, in conventional scroll-type fluid displacement apparatus, one scroll is fixed to a housing and the other scroll, which is the orbiting scroll, is eccentrically supported on a drive (or crank) pin of a rotating drive shaft to produce orbital motion. Such a scroll-type fluid displacement apparatus also includes a rotation preventing device which prevents the rotation of the orbiting scroll and thereby maintains both scrolls in a predetermined angular relationship during operation of the apparatus.

Sealing along the line contacts of such conventional scroll-type apparatus must be maintained because the fluid pockets are defined by the line contacts between the two spiral elements. As the line contacts shift along the surfaces of the spiral elements, the volume of the fluid pockets changes due to the orbital motion of the orbiting scroll. Because the orbiting scroll in such conventional scroll-type apparatus is supported in a cantilever manner, an axial tilt of the orbiting scroll also occurs. Axial tilt occurs because the movement of the orbiting scroll is not rotary motion around the center of the orbiting scroll, but is orbital motion produced by eccentric movement of the drive pin driven by the rotation of the drive shaft. Several problems result from this axial tilt, such as loss of line contact seal, vibration of the apparatus during operation, and noise caused by collisions between the spiral elements.

One simple and direct solution to these problems is the use of a thrust bearing device for carrying the axial thrust load. Thus, scroll-type fluid displacement apparatus have been provided with rotation preventing and thrust bearing devices within their housings.

One recent attempt to improve rotation preventing and thrust bearing devices for scroll-type fluid displacement apparatus is described in U.S. Pat. Nos. 4,160,629 and 4,259,043 to Hidden et al. The rotation preventing and thrust bearing devices in these U.S. patents are integral with one another. The rotation preventing and thrust bearing device described in these U.S. patents (see, e.g., U.S. Pat. No. 4,259,043 (FIG. 7)) comprises one set of indentations formed on the end surface of the circular plate of the orbiting scroll and a second set of indentations formed on an end surface of the fixed plate attached to the housing. A plurality of spheres are placed between facing indentations. Nevertheless, the indentations are formed directly on the end surface of the circular plate of the orbiting scroll or the fixed plate. The production of this type of mechanism, therefore, is very intricate.

Referring to FIGS. 1, 2, and 3, one solution to this disadvantage is described. FIG. 1 is an enlarged, cross-sectional view of a portion of a scroll-type apparatus, and FIG. 2 is an exploded perspective view of the rotation preventing and thrust bearing device 37' of FIG. 1. Rotation preventing and thrust bearing device 37' surrounds boss 273 of orbiting scroll 27. Annular steps 274 and 275, which concentrically surround boss 273, are formed at the end surface of circular end plate 271 opposite to spiral element 272. Annular step 274 is larger radially and closer to spiral element 272; annular step 275 is smaller radially and farther from spiral element 272. Similarly, annular step 113 is formed at the end surface of annular projection 112 of from end plate 11, which rotatably supports a drive shaft (not shown) and is fixedly attached to an opening portion of cup-shaped casing 12. Annular step 113 is concentric with annular projection 112.

Rotation preventing and thrust bearing device 37' include an orbital portion, a fixed portion, and bearings, such as a plurality of balls or spheres. The fixed portion includes (1) first annular race 371 which surrounds annular step 113 in a manner discussed below and (2) first ring 372 fitted against the axial end surface of annular projection 112 of front end plate 11 to overlap the end surface of first annular race 371. First annular race 371 is loosely fitted within annular step 113 because the outer diameter of first annular race 371 is designed to be slightly smaller than the diameter of an annular side wall 113a of annular step 113. First ring 372 is fixedly attached to the axial end surface of annular projection 112 by pins 373. The height of annular side wall 113a of annular step 113 is designed to be greater than the thickness of first annular race 371. The difference between the height of annular side wall 113a of annular step 113 and the thickness of first annular race 371 defines a clearance G between first annular race 371 and first ring 372.

The orbital portion includes (1) second annular race 374 which is disposed within annular step 274 in a manner discussed below and (2) second ring 375 fitted against the axial end surface of annular step 275 to overlap the axial end surface of second annular race 374. Second annular race 374 is loosely fitted within annular step 274 because the inner diameter of second annular race 374 is designed to be slightly greater than the diameter of an annular side wall 274a of annular step 274. Second ring 375 is fixedly attached to the axial end surface of annular step 275 by pins 376. Preferably, the height of annular side wall 274a of annular step 274 is greater than the thickness of second annular race 374. The difference between the height of annular side wall 274a of annular step 274 and the thickness of second annular race 374 also defines a clearance G between second annular race 374 and second ring 375 which is identical to the clearance between the first annular race 371 and the first ring 372.

First ring 372 and second ring 375 each have a plurality of pockets (or holes) 372a and 375a in the axial direction, and the number of pockets in each ring 372 and 375 is equal. Pockets 372a of first ring 372 correspond to or are mirror images of pockets 375a of the second ring 375, i.e., each pair of pockets face each other and have substantially the same size and curvature. Further, the radial distance of the pockets from the center of their respective rings 372 and 375 is the same, i.e., the centers of the pockets are located the same distance from the centers of the rings 372 and 375, respectively. Bearings, such as balls 377, are placed between facing, e.g., substantially aligned, pairs of pockets 372a and 375a.

Referring to FIG. 3, the operation of the rotation preventing and thrust bearing device 37' will be described. In FIG. 3, the center of second ring 375 is located off-center on the right side and the drive shaft rotates in a clockwise direction, as indicated by arrow A. When orbiting scroll 27 is driven by the rotation of the drive shaft, the center of second ring 375 orbits about a circle of radius $R_o$ (together with orbiting scroll 27). Nevertheless, a rotating force, i.e., a moment, which is produced by the offset of the acting point of the reaction force of compression and the acting point of the drive force, acts on orbiting scroll 27. This reaction force tends to rotate orbiting scroll 27 in a clockwise direction about the center of second ring 375. As depicted in FIG. 3, however, eighteen balls 377 may be placed between the corresponding pockets 372a and 375a of rings 372 and 375. In FIG. 3, the interaction between nine balls 377 at the top of the rotation preventing and thrust bearing device and the edges of the pockets 372a and 375a prevents the rotation of orbiting scroll 27. The magnitude of the rotation preventing forces are shown as $f_{c1-c5}$ in FIG. 3. As a result of the orbital motion of orbiting scroll 27, the interaction between the nine balls 377 and the edges of the pockets 372a and 375a successively shifts in the direction of the rotation of the drive shaft.

Not only does the reaction force of compression tend to rotate orbiting scroll 27 in the clockwise direction, but it tends to move orbiting scroll 27 forward, i.e., to the left in FIG. 1, and thereby to produce an axial thrust load on an inner end of the drive shaft which is applied through bushing 34. This axial thrust load is carried by the from end plate 11 through second annular race 374, all eighteen balls 377, and first annular race 371. Therefore, each of the eighteen balls 377 comes in contact with the end surfaces of both first and second annular races 371 and 374, and rolls thereon within the corresponding pockets 372a and 375a during the orbital motion of orbiting scroll 27. As balls 377 roll on the axial end surface of first annular race 371, the first annular race 371 freely rotates on the axial end surface of the annular step 113 because of a frictional contact between balls 377 and race 371. As a result, the circular trace of balls 377 on the axial end surface of first annular race 371 is sufficiently dispersed, so that exfoliation of the axial end surface of first annular race 371 should be effectively prevented. Similarly, the second annular race 374 freely rotates on the axial end surface of annular step 274 in the same direction, so that a similar reduction in exfoliation should be achieved.

In the configuration described above, rotation preventing and thrust bearing device 37' consists of a pair of races and a pair of rings, with each race and ring formed separately. Therefore, the parts of rotation preventing and thrust bearing device 37' are easy to construct, and the most suitable material for each part may be individually selected. Generally, in order to be able to bear the axial thrust load and the interacting stress adequately, balls 377, first and second rings 372 and 375, and first and second annular races 371 and 374 are made of stiff and hard material, for example, steel. In order to reduce the weight of the apparatus, however, front end plate 11, casing 12, and the two scroll members may be made of lightweight and relatively soft material, for example, aluminum alloy.

Accordingly, as first annular race 371 freely rotates on the axial end surface of the annular step 113 of front end plate 11 during operation of the apparatus, the axial end surface of first annular race 371 and the axial end surface of annular step 113 come into frictional contact. This frictional contact causes an abnormal abrasion at the softer axial end surface of annular step 113. Therefore, the clearance G between first annular race 371 and first ring 372 becomes greater than that allowable after a short time period during operation of the apparatus, and a similar unacceptable increase occurs in the clearance G between the second annular race 374 and second ring 375. As a result, the apparatus begins to defectively operate after a short time period.

SUMMARY OF THE INVENTION

Accordingly, it is an object of the present invention to provide a conducting device for conducting a lubricant, such as lubricating oil or mists of lubricating oil, in the housing to at least one of the contacting surfaces between the first annular race and the first annular step and the second annular race and the second annular step.

It is also an object of the present invention to provide a reliable rotation preventing and thrust bearing device for an orbiting member fluid displacement apparatus.

It is another object of this invention to provide a reliable rotation preventing and thrust bearing device that is relatively lightweight.

It is yet a further object of this invention to provide a reliable rotation preventing and thrust bearing device that is relatively simple in design and manufacture.

An orbiting member fluid displacement apparatus according to this invention includes a housing. A fixed member is attached to the housing and has a first end plate from which a first spiral element extends into the interior of the housing. An orbiting member has a second end plate from which a second spiral element extends. The first and second spiral elements interfit at an angular and radial offset to create a plurality of line contacts to define at least one pair of sealed off fluid pockets and separate a fluid inlet from a fluid outlet. A driving mechanism includes a drive shaft, which is rotatably supported by the housing and is operatively connected to the orbiting member to produce the orbital motion of the orbiting member.

A rotation preventing and thrust bearing device is disposed between the housing and the orbiting member to prevent the rotation of the orbiting member during orbital motion, so that the fluid pockets may change volume during the orbital motion of the orbiting member.

The rotation preventing and thrust bearing device comprises an orbital portion, a fixed portion, and a plurality of bearings, such as balls or spheres. The fixed portion includes a first annular race and a first ring, which are formed separately. The first annular race is placed in a loose fit within a first annular step formed on an inner surface of the housing, e.g., the outer diameter of the first annular race is less than the inner diameter of the first annular step. The first ring is attached to the inner surface of the housing to overlap the first annular race and has a plurality of first pockets formed in an axial direction and facing the first annular race. The orbital portion includes a second annular race and second ring, which also are formed separately. The second annular race is placed in a loose fit within a second annular step formed on an end surface of the second end plate opposite the side from which the second spiral element extends, e.g., the inner diameter of the second annular race is greater than the outer diameter of the second annular step. The second ring is attached to the end surface of the second end plate to overlap the second race and has a plurality of second pockets formed in an axial direction facing the second race.

A clearance is maintained between the second ring of the orbital portion and the first ring of the fixed portion. Bearings are placed between each pair of facing and substantially aligned first and second pockets of the rings. The rotation of the orbiting member is thus prevented by the bearings which are placed in the pockets of both rings. Further, thrust load from the orbiting member is borne by the first race of the fixed portion through the bearings. First contacting surfaces are maintained between the first annular race and the first annular step. Second contacting surfaces are maintained between the second annular race and the second annular step. The orbiting member fluid displacement apparatus is provided with a conducting device which conducts a lubricant, such as a mist or spray of lubricating oil, in the housing to the first or second contacting surfaces, or both.

Other objects, advantages, and features will be apparent when the detailed description of preferred embodiments of the invention and the drawings are considered.

DETAILED DESCRIPTION OF PREFERRED EMBODIMENTS

Figure 1:
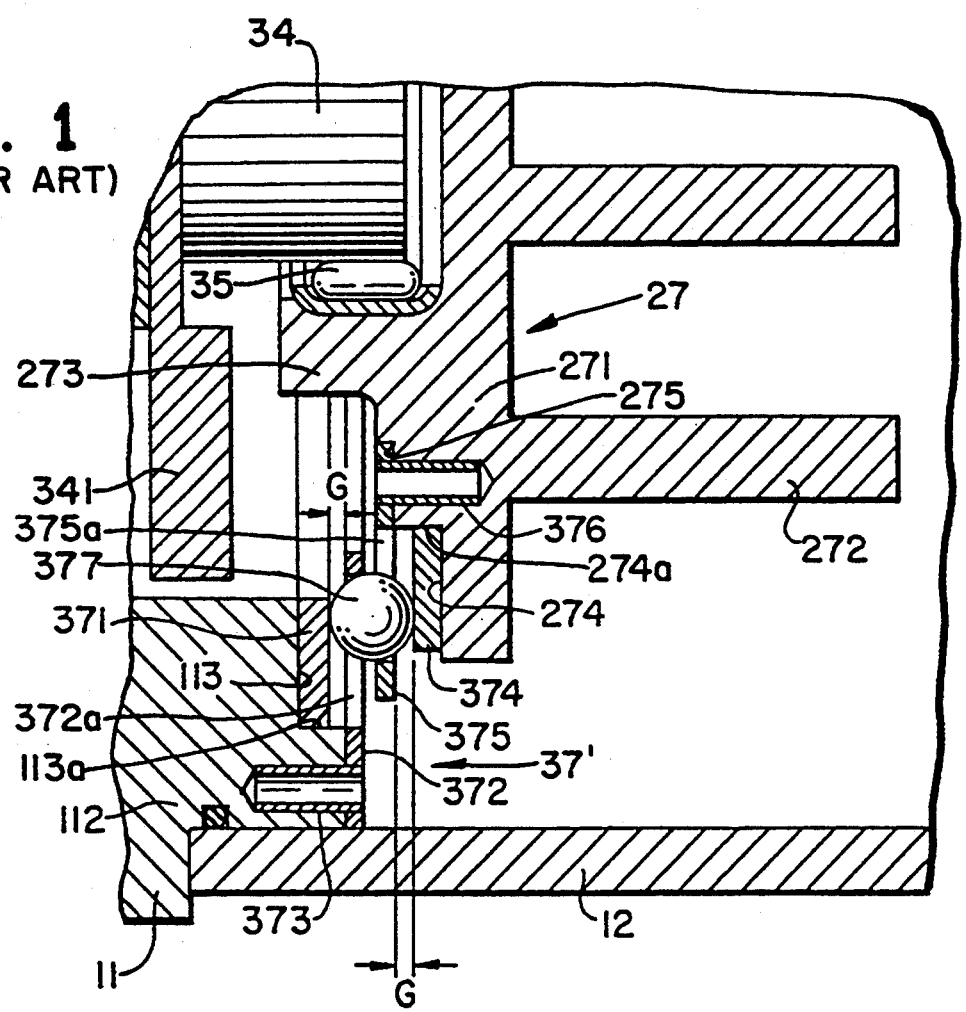
FIG. 1 is an enlarged, cross-sectional view of a portion of a scroll-type apparatus illustrating a prior art configuration of the rotation preventing and thrust bearing device.
Figure 2:
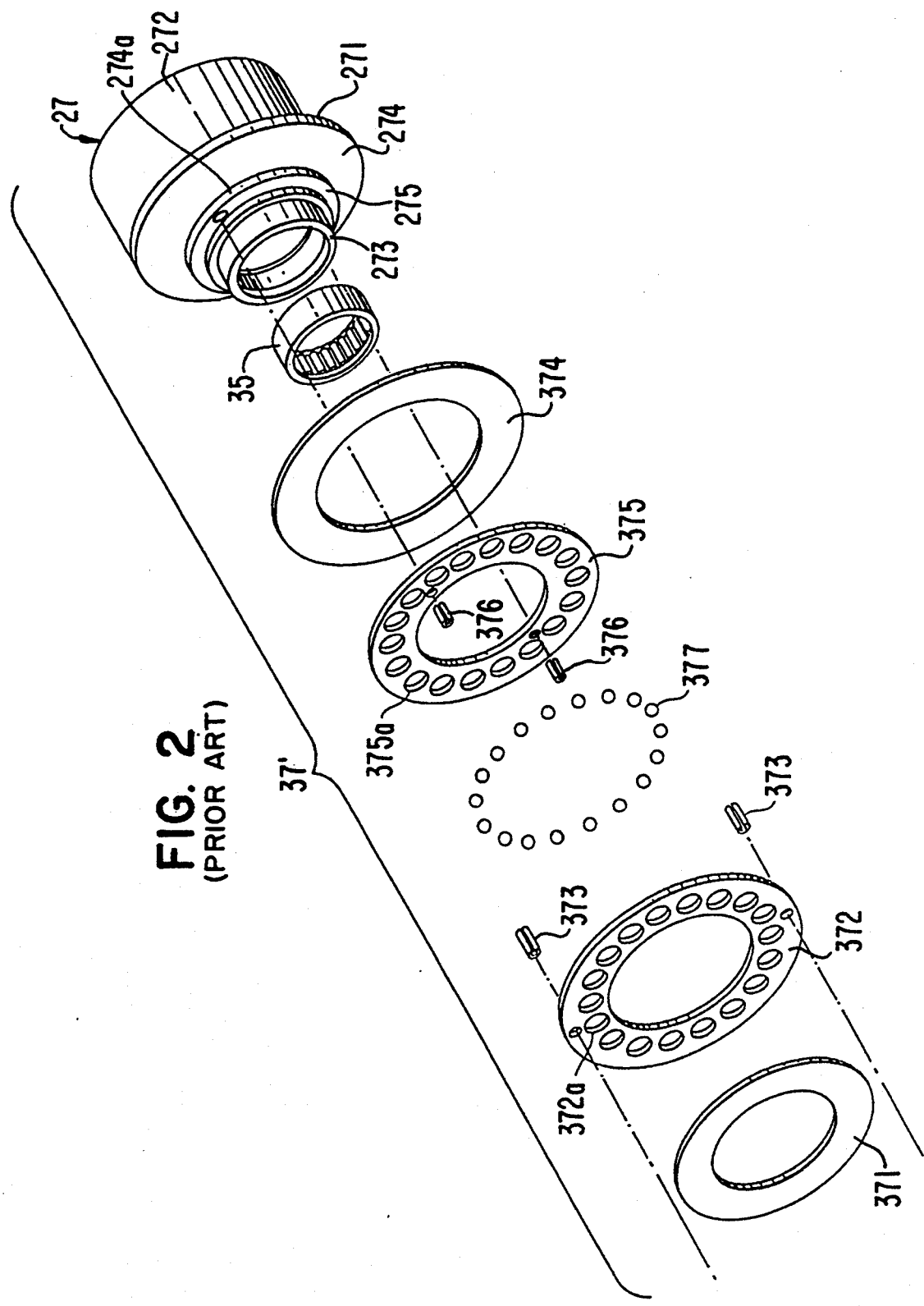
FIG. 2 is an exploded perspective view of the rotation preventing and thrust bearing device depicted in FIG. 1.
Figure 3:
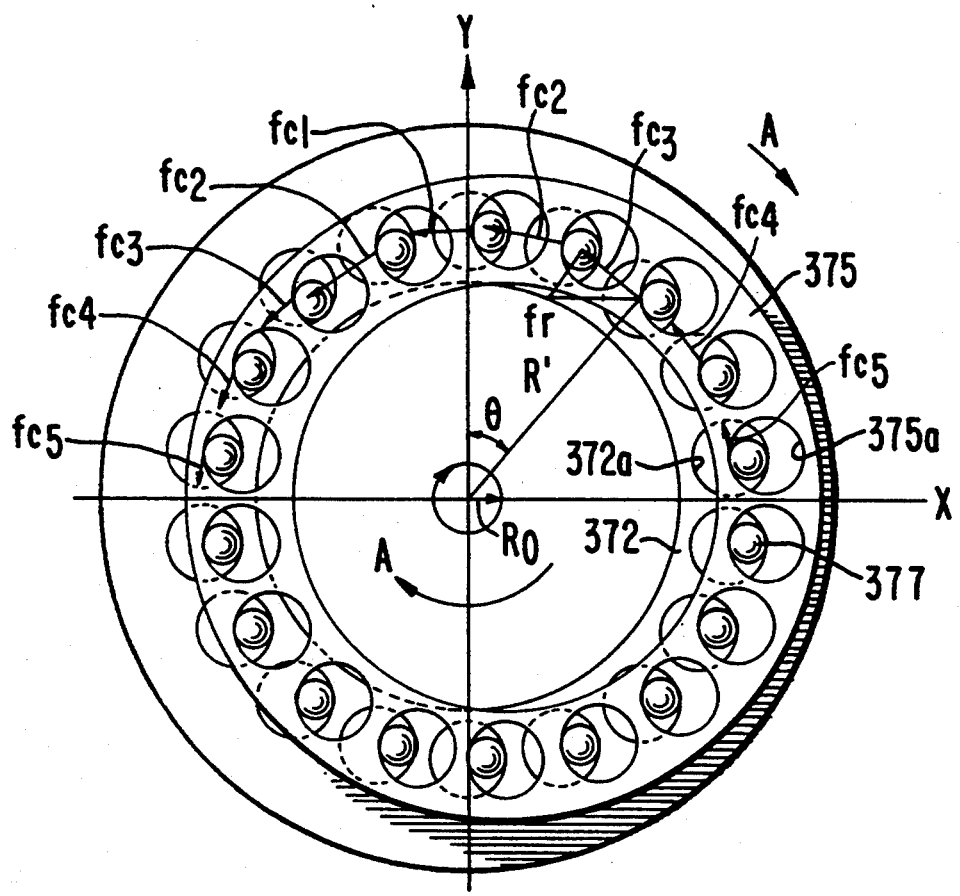
FIG. 3 is a diagrammatic plan view of the rotation preventing and thrust bearing device of FIG. 1 illustrating the manner by which rotation is prevented.

In FIGS. 4–8, identical reference numerals are used to denote elements which are similar to the identically numbered elements depicted in FIGS. 1, 2, and 3. Further, in the following description, the left side of FIGS. 4 and 7 will be referred to as the front or forward side and the right side will be referred to as the rear side.

Referring to FIGS. 4–8, a fluid displacement apparatus in accordance with a first embodiment of the present invention and in particular, a scroll-type refrigerant displacement apparatus 1, is depicted. Apparatus I includes an apparatus housing 10 having a front end plate 11 and a cup-shaped casing 12 which is attached to an end surface of front end plate 11. An opening 111 is formed in the center of front end plate 11 to permit passage of a drive shaft 13 therethrough. An annular projection 112 is formed in a rear end surface of front end plate 11. Annular projection 112 faces cup-shaped casing 12 and is concentric with opening 111. An outer peripheral surface of annular projection 112 extends into an inner wall of the opening portion of cup-shaped casing 12. Cup-shaped casing 12 is fixed on the rear end surface of front end plate 11 by a fastening device(s), for example, screws (not shown). The opening portion of cup-shaped casing 12 thus is covered by front end plate 11. An O-ring 14 is placed between the outer peripheral surface of annular projection 112 and the inner wall of the opening portion of cup-shaped casing 12 to seal the mating surfaces of front end plate 11 and cup-shaped casing 12. Front end plate 11 has an annular sleeve 15 projecting from the from end surface thereof which surrounds drive shaft 13 and defines a shaft cavity.

Figure 4:
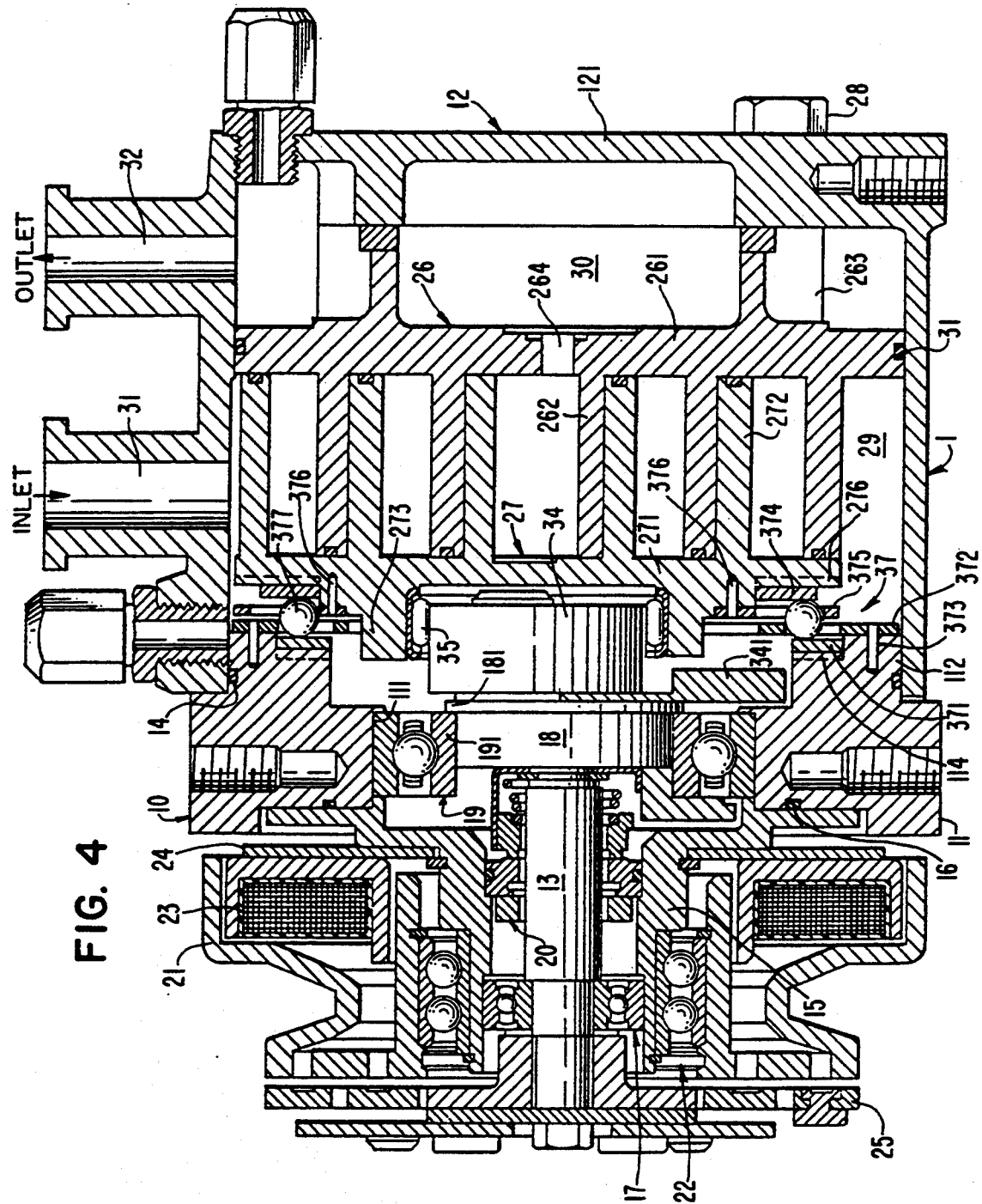
FIG. 4 is a cross-sectional view of an apparatus according to a first embodiment of the present invention.

In the embodiment depicted in FIG. 4, sleeve 15 is separate from front end plate 11. Therefore, sleeve 15 is fixed to the front end surface of front end plate 11 by screws (not shown). An O-ring 16 is placed between the end surface of from end plate 11 and an end surface of sleeve 15 to seal the mating surfaces of front end plate 11 and sleeve 15. Alternatively, sleeve 15 may be integral with front end plate 11.

Drive shaft 13 is rotatably supported by sleeve 15 through a bearing device 17 located within the front end of sleeve 15. Drive shaft 13 has a disk 18 at its inner end which is rotatably supported by front end plate 11 through a bearing device 19 located within opening 111 of front end plate 11. A shaft seal assembly 20 is coupled to drive shaft 13 within the shaft seal cavity defined by sleeve 15.

A pulley 21 is rotatably supported by a bearing assembly 22 which is mounted on the outer surface of sleeve 15. An electromagnetic coil 23 is fixed about the outer surface of sleeve 15 by a support plate 24 and is received in an annular cavity 21a of pulley 21. Armature plate 25 is elastically supported on the outer end of drive shaft 13 which extends from sleeve 15. An electromagnetic clutch thus includes pulley 21, electromagnetic coil 23, and armature plate 25. In operation, drive shaft 13 is driven by an external drive power source, for example, a vehicle engine, through a rotation force transmitting device, such as the above-described electromagnetic clutch.

A fixed scroll 26, an orbiting scroll 27, a driving mechanism for orbiting scroll 27, and a rotation preventing and thrust bearing device for orbiting scroll 27 are located within an inner chamber defined by cup-shaped casing 12. The inner chamber is formed between the inner wall of cup-shaped casing 12 and front end plate 11.

Fixed scroll 26 includes a circular end plate 261, a spiral element 262 affixed to and extending from one side surface of circular end plate 26 1, and a plurality of internally threaded bosses 263 axially projecting from the outer end surface of circular end plate 261. An end surface of each boss 263 is seated on the inner surface of an end plate 121 of cup-shaped casing 12 and is fixed to end plate 121 by screws 28. Fixed scroll 26 is thus fixed within cup-shaped casing 12. Circular end plate 261 of fixed scroll 26 divides the inner chamber of cup-shaped casing 12 into a discharge chamber 30 and a suction chamber 29 with a seal ring 31 placed between the outer peripheral surface of circular end plate 261 and the inner wall of cup-shaped casing 12. Discharge port 264 is formed through circular end plate 261 at a position near the center of spiral element 262.

Orbiting scroll 27 also includes a circular end plate 271 and spiral element 272 affixed to and extending from one side surface of circular end plate 271. Spiral element 272 and spiral element 262 of fixed scroll 26 interfit at an angular offset of 180° and a predetermined radial offset. At least one pair of fluid pockets are thereby defined between spiral elements 262 and 272. Discharge port 264 is concentric with the centrally located fluid pocket created by spiral elements 262 and 272 and the front-side circumference of discharge chamber 30. Orbiting scroll 27 which is connected to the driving mechanism and to the rotation preventing and thrust bearing device is driven in an orbital motion describing a circular radius $R_o$ by rotation of drive shaft 13 and thereby compresses fluid passing through the apparatus. Generally, radius $R_o$ of orbital motion is given by the following formula:

$$R_o = (P/2) - t$$

Figure 5:
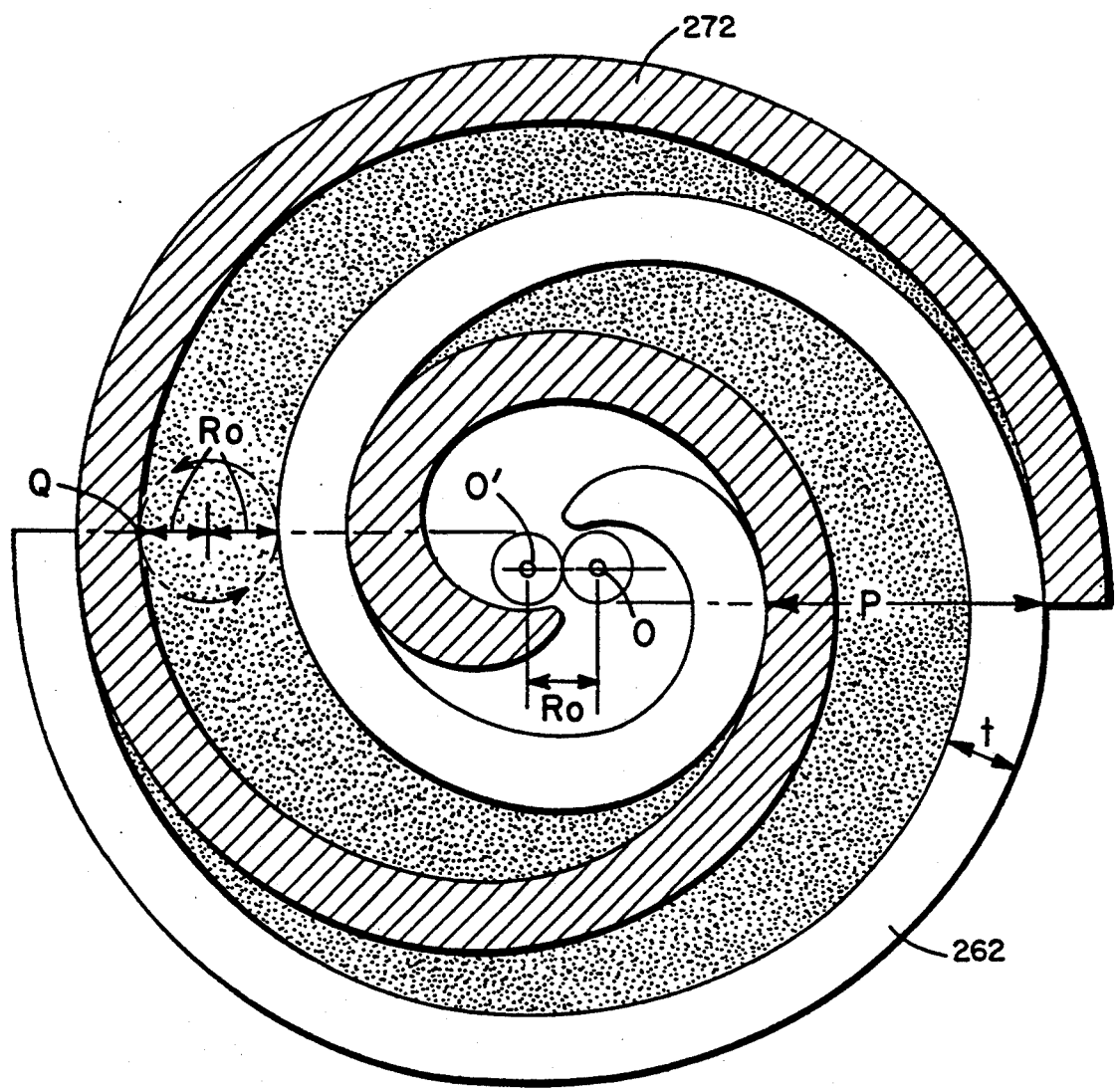
FIG. 5 is a diagrammatic, cross-sectional view illustrating the interfit of the spiral elements of the fixed and orbiting scrolls.
Figure 6:
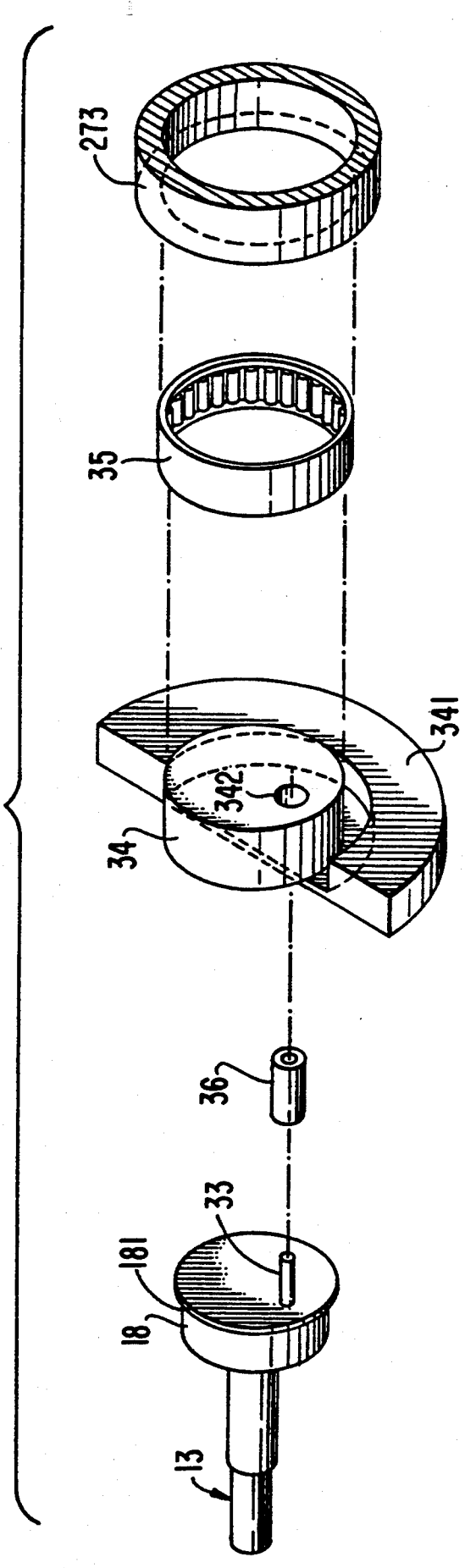
FIG. 6 is an exploded perspective view of the driving mechanism in the embodiment of FIG. 4.

As depicted in FIG. 5, the pitch (P) of the spiral elements may be defined by $2\pi rg$, where rg is the involute generating circle radius, and the wall thickness of the spiral element (t) may be measured at a point other than an inner end portion of the spiral element(s). The radius of orbital motion $R_o$ is also illustrated in FIG. 5 as the locus of an arbitrary point Q on spiral element 272 of orbiting scroll 27. A point C' is the center of spiral element 272 of orbiting scroll 27, and a point C is the center of spiral element 262 of fixed scroll 26. The center C' of spiral element 272 is radially offset from the center C of spiral element 262 of fixed scroll 26 by the distance $R_o$. Thus, orbiting scroll 27 undergoes orbital motion of a radius $R_o$ upon rotation of drive shaft 13. As orbiting scroll 27 orbits, the line contacts between spiral elements 262 and 272 move toward the center of the spiral elements along the surface of the spiral elements. Fluid pockets, which are defined between spiral elements 262 and 272, also move to the center with a consequent reduction in volume of these pockets and compression of the fluid in the fluid pockets.

The fluid, e.g., refrigerant gas containing a lubricant, which is introduced into suction chamber 29 from an external fluid circuit through an inlet port 31, is taken into fluid pockets formed between spiral elements 262 and 272 from the outer end portions of the spiral elements. As orbiting scroll 27 orbits, fluid in the fluid pockets is compressed and the compressed fluid is discharged into discharged chamber 30 from the central fluid pocket of the spiral elements through discharge port 264. The discharge fluid then flows to the external fluid circuit through an outlet port 32.

The lubricant, e.g., lubricating oil, may remain mixed with the refrigerant as long as the refrigerant remains in a liquid state. Nevertheless, when such mixed refrigerant is vaporized in an evaporator in the external fluid circuit, a substantial portion of the lubricant may separate from the refrigerant and be reduced to a fine spray or mist. This spray or mist of lubricant, e.g., lubricating oil mists, may then flow into and pass through the inner space of apparatus housing 10.

Referring again to FIGS. 4 and 6, the driving mechanism of orbiting scroll 27 will be described in greater detail. Drive shaft 13, which is rotatably supported by sleeve 15 through bearing device 17, includes disk 18 which is integrally formed on the inner end of drive shaft 13. Disk 18 is rotatably supported by front end plate 11 through bearing device 19 located within opening 111 of front end plate 11. Disk 18 includes an annular flange 181 extending radially from the periphery of a rear end surface thereof. Annular flange 181 of disk 18 is in contact with an annular inner race 191 of bearing device 19, so that the forward motion of drive shaft 13 is prevented. A drive pin 33 projects axially from an axial end surface of disk 18 at a position which is radially offset from the center of drive shaft 13. Circular end plate 271 of orbiting scroll 27 has a tubular boss 273 axially projecting from the end surface of orbiting scroll 27 opposite the surface from which spiral element 272 extends. A short axial bushing 34 fits into boss 273 and is rotatably supported therein by a bearing, such as needle bearing 35. Bushing 34 has a balance weight 341, which may have the shape of a portion of a disk or ring and extends radially from bushing 34 along a front surface thereof. An eccentric hole 342 is formed in bushing 34 at a position radially offset from center of bushing 34. Drive pin 33 fits into the eccentrically disposed hole 342 together with a bearing 36. Thus, bushing 34 is driven in orbital motion by the revolution of drive pin 33 and rotates within needle bearing 35.

In this embodiment, the rotation of orbiting scroll 27 is prevented by a rotation preventing and thrust bearing device 37 which is located between the inner surface of front end plate 11 and circular end plate 271 of orbiting scroll 27. As a result, orbiting scroll 27 orbits while maintaining its angular orientation relative to fixed scroll 26.

Figure 7:
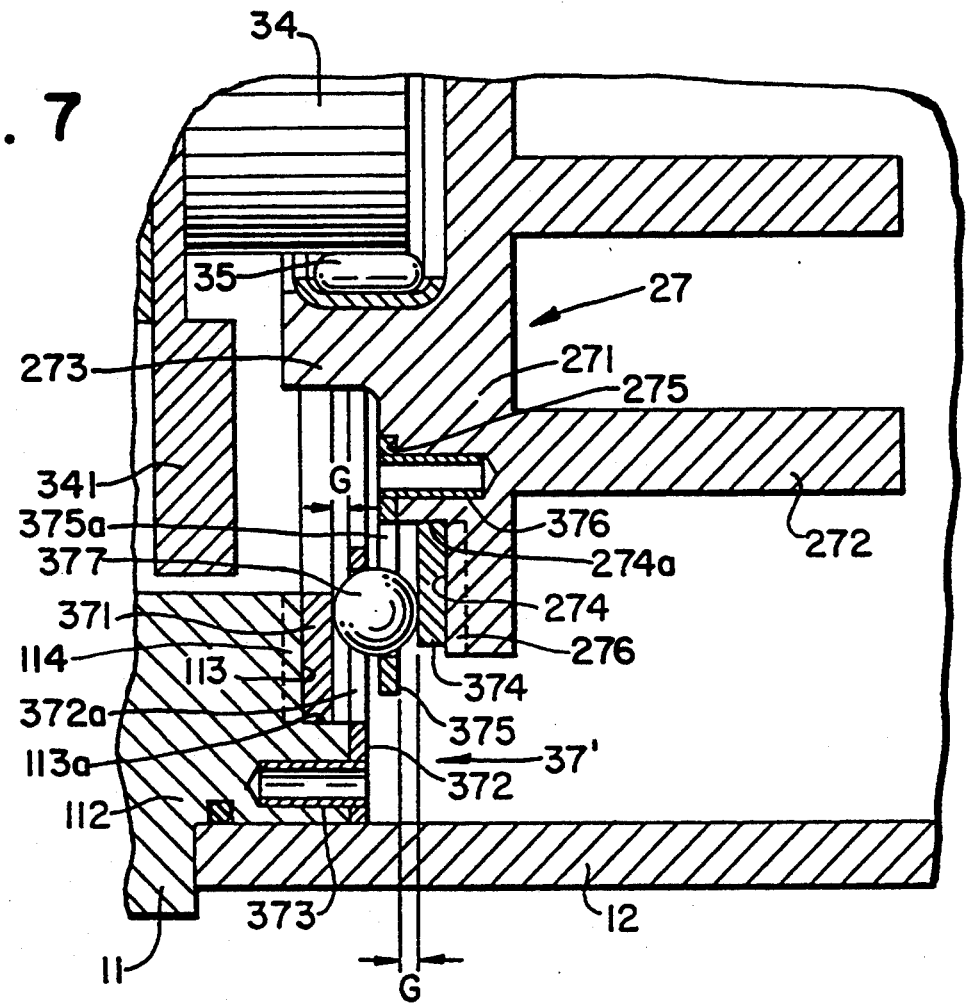
FIG. 7 is an enlarged, cross-sectional view of a portion of the apparatus depicted in FIG. 4.
Figure 8:
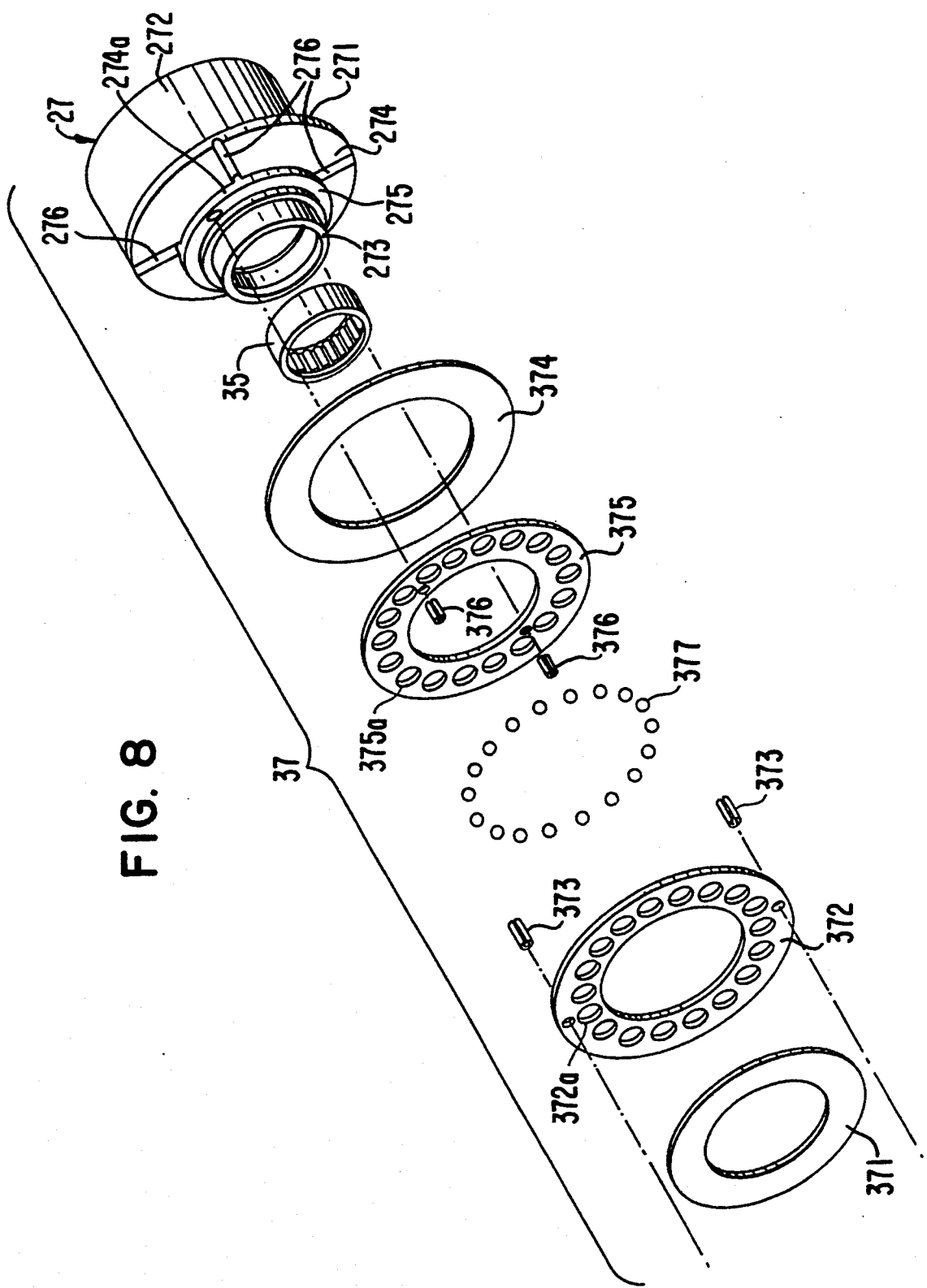
FIG. 8 is an exploded perspective view of the rotation preventing and thrust bearing device depicted in FIG. 4.

Referring to FIGS. 7 and 8, in addition to FIG. 4, rotation preventing and thrust bearing device 37 surrounds boss 273 of orbiting scroll 27. Annular steps 274 and 275, which concentrically surround boss 273, are formed at the end surface of circular end plate 271 opposite spiral element 272. Annular step 274 is radially larger and closer to spiral element 272, and annular step 275 is radially smaller and farther from spiral element 272. Annular step 113 is formed at the end surface of annular projection 112 of front end plate 11, which rotatably supports disk 18 of drive shaft 13 through bearing device 19, and is fixedly attached to the opening portion of cup-shaped casing 12. Annular step 113 is concentric with annular projection 112.

Rotation preventing and thrust bearing device 37 includes an orbital portion, a fixed portion, and bearings, such as a plurality of balls or spheres. The fixed portion includes (1) first annular race 371 which is disposed surrounding annular step 113 in a manner discussed below and (2) first ring 372 fitted against the axial end surface of annular projection 112 of front end plate 11 to overlap the end surface of first annular race 371. First annular race 371 is loosely fitted within annular step 113 because the outer diameter of first annular race 371 in designed to be slightly less than the inner diameter of annular side wall 113a of annular step 113. First ring 372 is fixedly attached to the axial end surface of annular projection 112 by pins 373. The height of annular side wall 113a of annular step 113 is designed to be greater than the thickness of first annular race 371. Preferably, the difference between the height of annular side wall 113a of annular step 113 and the thickness of first annular race 371 defines a clearance C, between first annular race 371 and first ring 372.

The orbital portion includes (1) second annular race 374 which is disposed within annular step 274 in a manner discussed below and (2) second ring 375 fitted against the axial end surface of annular step 275 to overlap the axial end surface of second annular race 374. Second annular race 374 is loosely fitted within annular step 274 because an inner diameter of second annular race 374 is designed to be slightly greater then the outer diameter of an annular side wall 274a of annular step 274. Second ring 375 is fixedly attached to the axial end surface of annular step 275 by pins 376. The height of annular side wall 274a of annular step 274 is designed to be greater than the thickness of second annular race 374. Preferably, the difference between the height of annular side wall 274a of annular step 274 and the thickness of second annular race 374 defines a clearance G between second annular race 374 and second ring 375 which may be identical to the clearance between the first annular race 371 and the first ring 372.

First ring 372 and second ring 375 each have a plurality of pockets (or holes) 372a and 375a in the axial direction, and preferably, the number of pockets in each ring 372, 375 is equal. Pockets 372a of first ring 372 correspond to and may be mirror images of pockets 375a of second ring 375, i.e., each pair of pockets may face each other and have the same size and curvature. Moreover, the radial distance of the pockets from the center of their respective rings 372 and 375 may be the same, i.e., the centers of the pockets may be equidistant from the center of rings 372 and 375.

In this embodiment, in order to be able to adequately bear the axial thrust load and the interacting stress, balls 377, first and second rings 372 and 375, and first and second annular races 371 and 374 may be made of stiff and hard material, for example, steel. In order to reduce the weight of the apparatus, front end plate 11, casing 12, and scrolls 26 and 27 may be made of lightweight material, for example, aluminum alloy.

Figure 9:
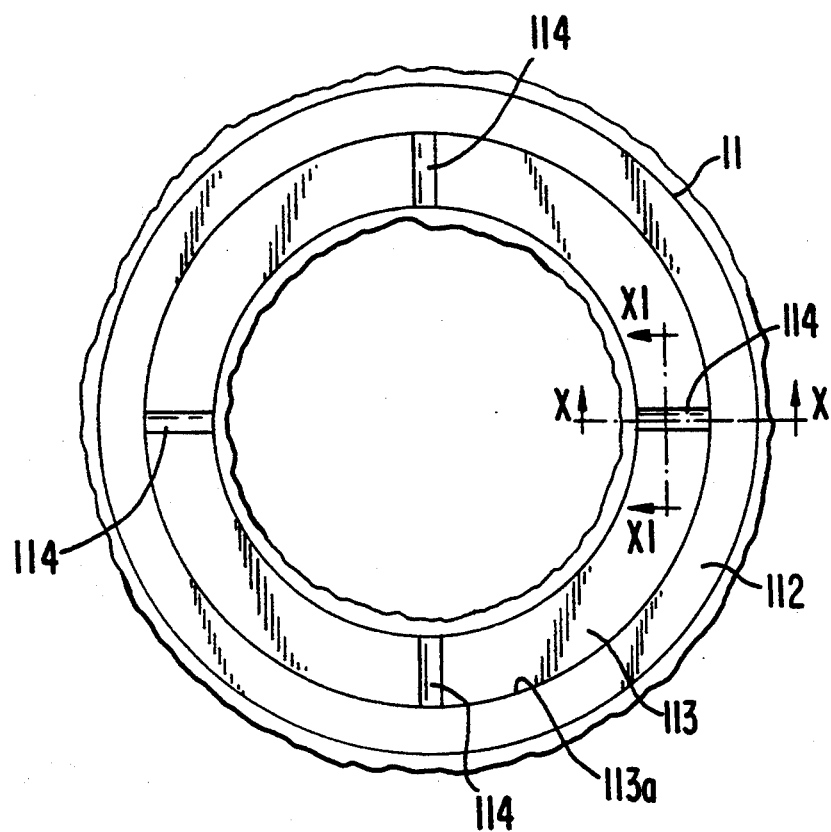
FIG. 9 is a side view of a portion of the front end plate depicted in FIG. 4.
Figure 10:
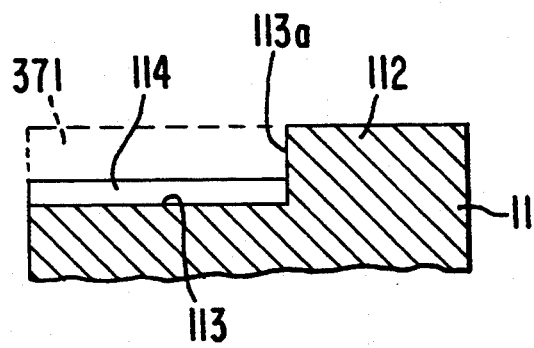
FIG. 10 is an enlarged, cross-sectional view taken on line X—X of FIG. 9.
Figure 11:
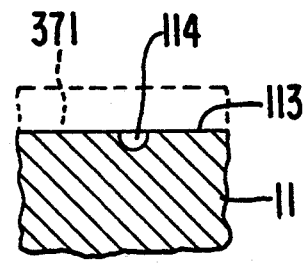
FIG. 11 is an enlarged, cross-sectional view taken on line XI—XI of FIG. 9.
Figure 12:
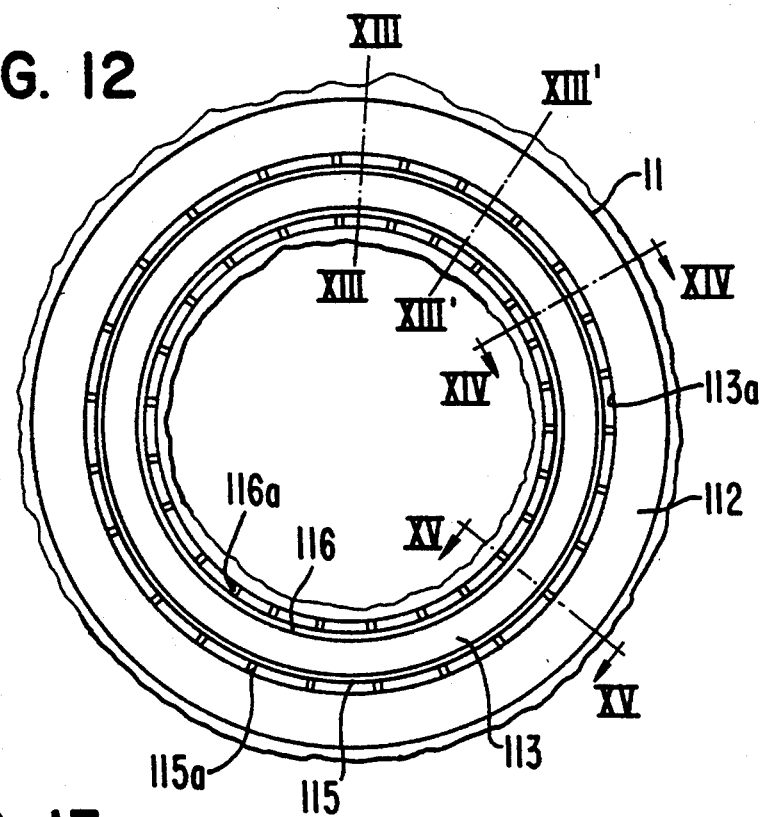
FIG. 12 is a side view of a portion of the front end plate provided in an apparatus according to a second embodiment of the present invention.
Figure 13:
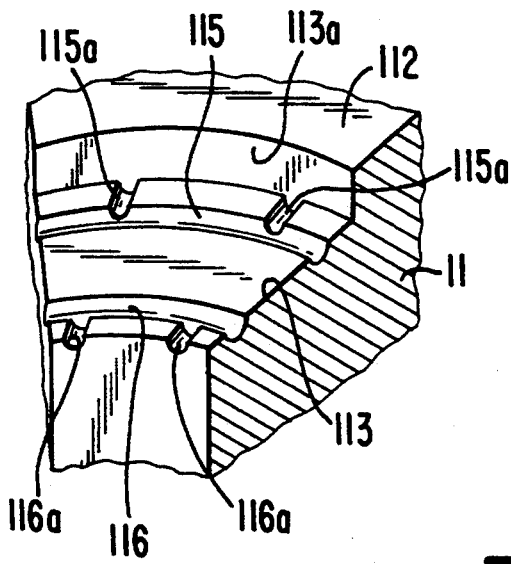
FIG. 13 is a perspective view of one portion which is cut out along lines XIII—XIII and XIII'—XIII' from the front end plate depicted in FIG. 12.

Referring to FIGS. 9, 10, and 11 in addition to FIGS. 4 and 7, a plurality of radial grooves 114 having semicircular cross-sections may be formed in an axial end surface of annular step 113. In this embodiment, four radial grooves 114 may be formed in the axial end surface of annular step 113, and spaced from one another at equiangular intervals. Preferably, each radial groove 114 extends across the entire width of annular step 113. Radial grooves 114 conduct lubricant, such as lubricating oil mists, in housing 10 to first contacting surfaces between first annular race 371 and annular step 113. Further, radial grooves 114 may be formed during casting of front end plate 11. After formation of radial grooves 114, the axial end surfaces of annular step 113 and annular projection 112 may be cut to form a fine surface, wherein surface roughness $R_a$ may be less than or equal to about 1.6a (ANSI B46.1-1978), continuous with radial grooves 114. In addition, one axial end surface of first annular race 371 facing the axial end surface of annular step 113 may be formed by grinding that surface to a fine surface wherein surface roughness $R_a$ may be equal to about 0.25a (ANSI B46.1-1978).

Similarly, as depicted in FIG. 8, a plurality of radial grooves 276 also having semicircular cross-sections may be formed in an axial end surface of annular step 274 of circular end plate 271 of orbiting scroll 27. In this embodiment, four radial grooves 276 may be formed in the axial end surface of annular step 274, and spaced from one another at equiangular intervals. Preferably, each of radial grooves 276 extends across the entire width of annular step 274. Radial grooves 276 conduct lubricant, such as lubricating oil mists, in housing 10 to second contacting surfaces between second annular race 374 and annular step 274. Further, radial grooves 276 may be formed during casting orbiting scroll 27. After formation of radial grooves 276, the axial end surfaces of annular steps 274 and 275 may be cut to form a fine surface, wherein surface roughness $R_a$ may be less than or equal to about 1.6a (ANSI B46.1-1978), continuous with radial grooves 276. In addition, one axial end surface of second annular race 374 facing the axial end surface of annular step 274 may be, formed by grinding to a fine surface, wherein surface roughness $R_a$ may be equal to about 0.25a (ANSI B46.1-1978).

During operation of the apparatus, as first annular race 371 rotates freely on the axial end surface of annular step 113 of front end plate 11, the hard axial end surface of first annular race 371 and the soft axial end surface of annular step 113 come into frictional contact.

Nevertheless, the mists of the lubricating oil suspended in an inner hollow space of housing 10 may be effectively conducted to the contact surfaces between first annular race 371 and annular step 113 of front end plate 11 through radial grooves 114, so that a lubricant film having a sufficient thickness is formed therebetween. Consequently, the first contacting surfaces between first annular race 371 and annular step 113 of front end plate 11 are sufficiently lubricated during operation of the apparatus. In addition, when operation of the apparatus stops, a sufficient amount of the lubricating oil is retained in radial grooves 114, so that the lubricant film having the sufficient thickness is instantly formed at the contact surfaces between the first annular race 371 and the annular step 113 of front end plate 11 when operation of the apparatus resumes. As a result, exfoliation of the contacting surfaces of first annular race 371 and annular step 113 of front end plate 11 is sufficiently reduced despite the frictional contact between hard and soft metal surfaces. Accordingly, the clearance G between first annular race 371 and first ring 372 is maintained at an acceptable value during an extended period of operation of the apparatus. A similar clearance is maintained between second annular race 374 and second ring 375. Accordingly, effective operation of the apparatus is maintained for a greatly increased period.

FIGS. 12–15, 16–17, 18–19, and 20–21 illustrate structural features of an apparatus according to a second through a sixth embodiment of the present invention, respectively. In FIGS. 12–21, identical reference numerals are used to denote elements corresponding to the similar elements depicted in FIGS. 4–11. Further, the operation of each of the embodiments is similar to that of the first embodiment, so that separate explanations thereof are omitted.

Referring to FIGS. 12–15, which illustrate the construction of the apparatus according to a second embodiment, first and second annular grooves 115 and 116 each having a semicircular cross-section are formed at the axial end surface of annular step 113. First and second annular grooves 115 and 116 are concentric with annular step 113, and an inner diameter of first annular groove 115 is greater than an outer diameter of second annular groove 116. At least one first outer radial grooves 115a also having a semicircular cross-section may be formed at the axial end surface of annular step 113. Each of first outer radial grooves 115a may extend from first annular groove 115 to the annular side wall 113a of annular step 113. First outer radial grooves 115a may be spaced from one another at equiangular intervals. At least one first inner radial grooves 116a also having a semicircular cross-section may also be formed at the axial end surface of annular step 113. Each of first inner radial grooves 116a may extend from second annular groove 116 to an annular inner edge of annular step 113. First inner radial grooves 116a may also be spaced from one another at equiangular intervals and may be radially align with corresponding first outer radial grooves 115a.

Figure 14:
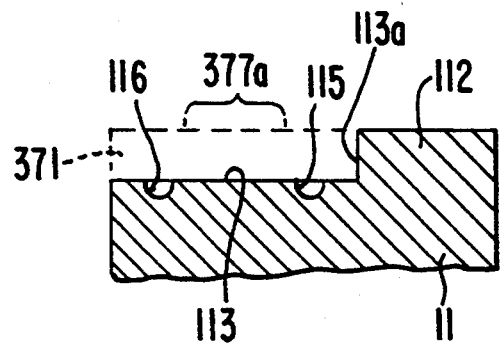
FIG. 14 is an enlarged, cross-sectional view taken on line XIV—XIV of FIG. 12.
Figure 15:
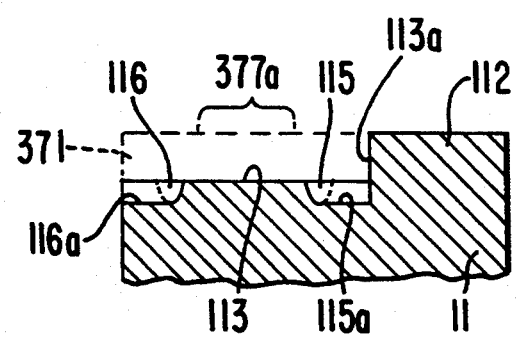
FIG. 15 is an enlarged, cross-sectional view taken on line XV—XV of FIG. 12.

First and second annular grooves 115 and 116 and first outer and first inner radial grooves 115a and 116a may be formed during casting of front end plate 11. Similar cutting and grinding processes to those described with respect to the first embodiment may be performed in the axial end surfaces of annular step 113 and annular projection 112, and one axial end surface of first annular race 371 facing the axial end surface of annular step 113, respectively. As depicted in FIG. 14, first and second annular grooves 115 and 116 may be positioned so as not to be overlapped by, e.g., to be outside of, an annular area 377a which is defined by the rolling traces of balls 377 on the axial end surface of first annular race 371. Therefore, an unnecessary flexing of first annular race 371 in first and second annular grooves 115 and 116 may be eliminated.

During operation of the apparatus, as first annular race 371 freely rotates on the axial end surface of annular step 113 of front end plate 11, the hard axial end surface of first annular race 371 and the soft axial end surface of annular step 113 come into frictional contact. Nevertheless, mists of the lubricating oil suspended in an inner hollow space of housing 10 may be effectively conducted in this embodiment in a manner similar to that described with respect to the first embodiment.

Figure 16:
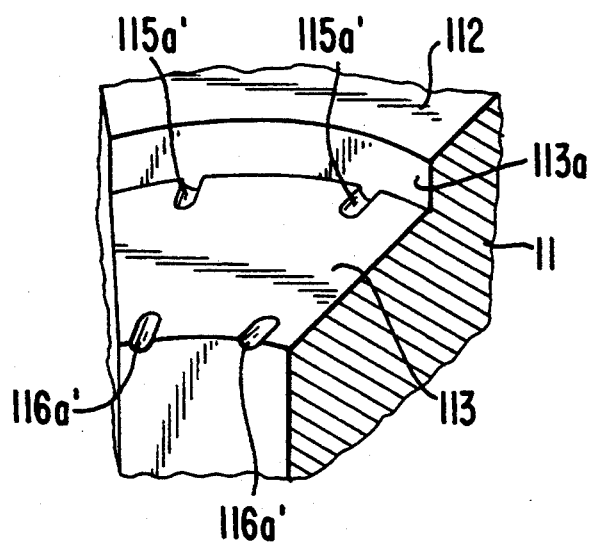
FIG. 16 is a view similar to FIG. 13. In this figure, however, one portion of a front end plate provided in an apparatus according to a third embodiment of the present invention is illustrated.
Figure 17:
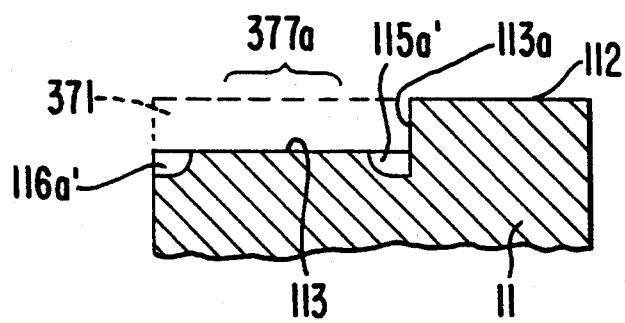
FIG. 17 is a view similar to FIG. 15. In this figure, however, a cross-sectional view of the front end plate depicted in FIG. 16 is illustrated.

Referring to FIGS. 16 and 17 which illustrate the construction of the apparatus according to a third embodiment, at least one first outer radial grooves 115a' having a semicircular cross-section may be formed in an outer annular portion of the axial end surface of annular step 113. First outer radial grooves 115a' may be spaced from one another at equiangular intervals. At least one first inner radial grooves 116a' also having a semicircular cross-section may be formed in an inner annular portion of the axial end surface of annular step 113. First inner radial grooves 116a' may also be spaced from one another at equiangular intervals to radially align with the corresponding first outer radial grooves 115a'. First outer and first inner radial grooves 115a' and 116a' may be positioned so as not to be overlapped by, e.g., to be outside of, the annular area 377a which is defined by the rolling traces of balls 377 on the axial end surface of first annular race 371. Therefore, an unnecessary flexing of first annular race 371 in first outer and first inner radial grooves 115a' and 116a' again may be eliminated.

First outer and first inner radial grooves 115a' and 116a' may be formed during casting of front end plate 11. Similar cutting and grinding processes to those described with respect to the first embodiment may be performed in the axial end surfaces of annular step 113 and annular projection 112, and one axial end surface of first annular race 371 facing the axial end surface of annular step 113, respectively.

Figure 18:
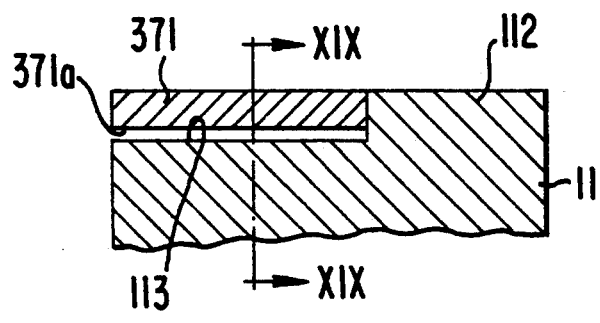
FIG. 18 is a view similar to FIG. 10. In this figure, however, a cross-sectional view of a first annular race provided in an apparatus according to a fourth embodiment of the present invention is illustrated.
Figure 19:
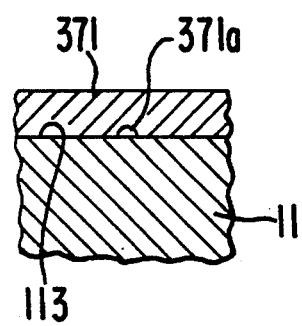
FIG. 19 is a cross-sectional view taken on line XIX—XIX of FIG. 18.

Further, in accordance with the first embodiment, radial grooves 114 are depicted in FIGS. 9–11 as formed in the axial end surface of annular step 113. Nevertheless, as illustrated in FIGS. 18 and 19, a rotary fluid displacement apparatus according to the present invention may include radial grooves 371a which are formed in one axial end surface of first annular race 371 facing the axial end surface of annular step 113. In particular, this modification may be applied to the grooves depicted in FIGS. 12–15 and 16–17.

Figure 20:
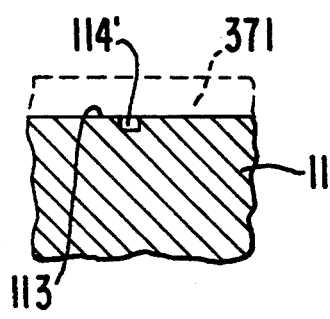
FIG. 20 is a view similar to FIG. 11. In this figure, however, a cross-sectional view of a front end plate provided in an apparatus according to a fifth embodiment of the present invention is illustrated.
Figure 21:
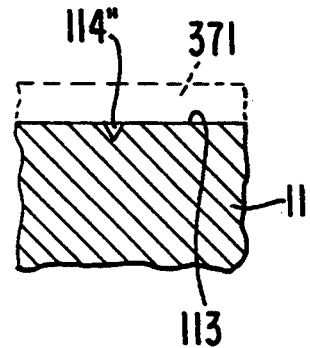
FIG. 21 is a view similar to FIG. 11. In this figure, however, a cross-sectional view of a front end plate provided in an apparatus according to a sixth embodiment of the present invention is illustrated.

Moreover, in accordance with the first embodiment, the cross-sectional view of radial grooves 114 may be semicircular as depicted in FIG. 11. Nevertheless, the present invention is not restricted thereto. The present invention may include, for example, radial grooves 114' having a rectangular cross-section, as depicted in FIG. 20, or radial grooves 114" having a triangular cross-section, as depicted in FIG. 21. These modifications may also be applied to the grooves depicted in FIGS. 12–15, 16–17 and 18–19.

This invention has been described in detail in connection with preferred embodiments. These embodiments, however, are merely exemplary, and the invention is not intended to be restricted thereto. In particular, similar constructions to those described with respect to the second through sixth embodiments discussed above may be formed in the axial end surfaces of annular step 274 or second annular race 374, as indicated in FIGS. 4 and 7. It will be understood by those skilled in the art that other variations and modifications can be made within the scope of this invention as defined by the following claims.

I claim:

1. A scroll-type fluid displacement apparatus which comprises a housing; a fixed scroll attached to said housing and having a first end plate from which a first spiral element extends into said housing; an orbiting scroll having a second end plate from which a second spiral element extends, said first and second spiral elements interfitting at an angular and radial offset to create a plurality of line contacts to define at least one pair of sealed off fluid pockets and a driving mechanism operatively connected to said orbiting scroll to produce orbital motion of said orbiting scroll; a rotation preventing device for preventing rotation of said orbiting scroll and for bearing axial thrust load from said orbiting scroll during orbital motion, so that the volume of said fluid pockets changes, said rotation preventing and thrust bearing device disposed between said second end plate and said housing and comprised of an orbital portion, a fixed portion, and bearing elements coupled between said portions, said fixed portion including a first annular race having an outer diameter and a first ring, said first annular race placed within a first annular step which has an inner diameter and is formed in said housing, such that said first annular race's outer diameter is less than said first annular step's inner diameter, said first ring being attached to said housing to overlap said first annular race, said first ring having a plurality of first pockets extending axially and facing said first annular race and formed separately from said first annular race, said orbital portion including a second annular race having an outer diameter and a second ring, said second annular race placed within a second annular step which has an inner diameter and is formed in said second end plate, such that said second annular race's inner diameter is greater than said second annular step's outer diameter, said second ring being attached to said second end plate to overlap said second annular race and facing said first ring, said second ring having a plurality of second pockets extending axially and facing said second annular race and formed separately from said second annular race, a clearance being maintained between said first ring of said fixed portion and said second ring of said orbital portion, each of said bearing elements being carried within a substantially aligned pair of said first and second pockets and contacting said second and first annular races to prevent rotation of said orbiting scroll by said bearing elements interacting with said second and first rings and to bear the axial thrust load from said orbiting scroll on said first race through said bearing elements, first contacting surfaces between said first annular race and said first annular step, second contacting surfaces between said second annular race and said second annular step; and a conducting device including at least one groove in at least one of said contacting surfaces for conducting a lubricant in said housing to said at least one of said first and second contacting surfaces.

2. The scroll-type fluid displacement apparatus of claim 1 wherein said conducting device comprises at least one annular groove formed in an axial end surface of said second annular step and facing said second annular race.

3. The scroll-type fluid displacement apparatus of claim 1 said conducting device includes at least one radial groove formed in an axial end surface of said first annular race and facing said first annular step.

4. The scroll-type fluid displacement apparatus of claim 1 said conducting device includes at least one radial groove formed in an axial end surface of said second annular race and facing said second annular step.

5. The scroll-type fluid displacement apparatus of claim 1 wherein said conducting device comprises first and second annular grooves formed in an axial end surface of said first annular step and facing said first annular race.

6. The scroll-type fluid displacement apparatus of claim 5 wherein an inner diameter of said first annular groove is greater than an outer diameter of said second annular groove.

7. The scroll-type fluid displacement apparatus of claim 6 wherein said first and second annular grooves are positioned, so that said grooves are outside of an annular area traced by said bearing elements on an axial end surface of said first annular race.

8. The scroll-type fluid displacement apparatus of claim 7 further comprising at least one first outer radial groove which extends from said first annular groove to a side wall of said first annular step and at least one first inner radial groove which extends from said second annular groove to an annular inner edge of said first annular step.

9. The scroll-type fluid displacement apparatus of claim 8 wherein said first outer radial grooves are spaced from one another at equiangular intervals.

10. The scroll-type fluid displacement apparatus of claim 9 wherein said first inner radial grooves are spaced from one another at equiangular intervals.

11. The scroll-type fluid displacement apparatus of claim 10 wherein each of said first outer grooves is radially aligned with at least one of said first inner radial grooves.

12. The scroll-type fluid displacement apparatus of claim 5 wherein said conducting means further includes a third and fourth annular grooves formed in an axial end surface of said second annular step facing said second annular race.

13. The scroll-type fluid displacement apparatus of claim 12 wherein an inner diameter of said third annular groove is greater than an outer diameter of said fourth annular groove.

14. The scroll-type fluid displacement apparatus of claim 13 wherein said third and fourth annular grooves are positioned, so that said grooves are outside of an annular area traced by said bearing elements on an axial end surface of said second annular race.

15. The scroll-type fluid displacement apparatus of claim 14 further comprises at least one second outer radial groove which extends from said third annular groove to an annular outer edge of said second annular step, and at least one second inner radial groove which extends from said fourth annular groove to a side wall of said second annular step.

16. The scroll-type fluid displacement apparatus of claim 15 wherein said second outer radial grooves are spaced from one another at equiangular intervals.

17. The scroll-type fluid displacement apparatus of claim 16 wherein said second inner radial grooves are spaced from one another at equiangular intervals.

18. The scroll-type fluid displacement apparatus of claim 17 wherein each of said second outer radial grooves is radially aligned with at least one of said second inner radial grooves.

19. The scroll-type fluid displacement apparatus of claim 1 wherein said conducting device comprises at least one first outer and at least one first inner radial grooves which are formed at the outer and the inner annular portions, respectively of an axial end surface of said first annular step and face said first annular race.

20. The scroll-type fluid displacement apparatus of claim 19 wherein said conducting device includes at least one second outer and at least one second inner radial grooves which are formed at outer and inner annular portions, respectively, of an axial end surface of said second annular step and facing said second annular race.

21. The scroll-type fluid displacement apparatus of claim 20 wherein said at least one second outer and at least one second inner radial grooves are positioned, so that said at least one second outer and at least one second inner radial grooves are outside of an annular area traced by said bearing elements on the axial end surface of said second annular race.

22. The scroll-type fluid displacement apparatus of claim 21 wherein said second outer radial grooves are spaced from one another at equiangular intervals.

23. The scroll-type fluid displacement apparatus of claim 22 wherein said second inner radial grooves are spaced from one another at equiangular intervals.

24. The scroll-type fluid displacement apparatus of claim 23 wherein each of said second outer radial grooves is radially aligned with at least one of said second inner radial grooves.

25. The scroll-type fluid displacement apparatus of claim 19 wherein said at least one first outer and first inner radial grooves are positioned, so that said grooves are outside of an annular area traced by said bearing elements on the axial end surface of said first annular race.

26. The scroll-type fluid displacement apparatus of claim 25 wherein said first outer radial grooves are spaced from one another at equiangular intervals.

27. The scroll-type fluid displacement apparatus of claim 26 wherein said first inner radial grooves are spaced from one another at equiangular intervals.

28. The scroll-type fluid displacement apparatus of claim 27 wherein each of said first outer radial grooves is radially aligned with at least one of said first inner radial grooves.

29. A scroll-type fluid displacement apparatus which comprises a housing; a fixed scroll attached to said housing and having a first end plate from which a first spiral element extends into said housing; an orbiting scroll having a second end plate from which a second spiral element extends, said first and second spiral elements interfitting at an angular and radial offset to create a plurality of line contacts to define at least one pair of sealed off fluid pockets and a driving mechanism operatively connected to said orbiting scroll to produce orbital motion of said orbiting scroll; a rotation preventing device for preventing rotation of said orbiting scroll and for bearing axial thrust load from said orbiting scroll during orbital motion, so that the volume of said fluid pockets changes, said rotation preventing and thrust bearing device disposed between said second end plate and said housing and comprised of an orbital portion, a fixed portion, and bearing elements coupled between said portions, said fixed portion including a first annular race having an outer diameter and a first ring, said first annular race placed within a first annular step which has an inner diameter and is formed in said housing, such that said first annular race's outer diameter is less than said first annular step's inner diameter, said first ring being attached to said housing to overlap said first annular race, said first ring having a plurality of first pockets extending axially and facing said first annular race and formed separately from said first annular race, said orbital portion including a second annular race having an outer diameter and a second ring, said second annular race placed within a second annular step which has an inner diameter and is formed in said second end plate, such that said second annular race's inner diameter is greater than said second annular step's outer diameter, said second ring being attached to said second end plate to overlap said second annular race and facing said first ring, said second ring having a plurality of second pockets extending axially and facing said second annular race and formed separately from said second annular race, a clearance being maintained between said first ring of said fixed portion and said second ring of said orbital portion, each of said bearing elements being carried within a substantially aligned pair of said first and second pockets and contacting said second and first annular races to prevent rotation of said orbiting scroll by said bearing elements interacting with said second and first rings and to bear the axial thrust load from said orbiting scroll on said first race through said bearing elements, first contacting surfaces between said first annular race and said first annular step, second contacting surfaces between said second annular race and said second annular step; and a conducting device for conducting a lubricant in said housing to at least one of said first and second contacting surfaces;

wherein said conducting device comprises at least one first radial groove formed in an axial end surface of said first annular step facing said first annular race.

30. The scroll-type fluid displacement apparatus of claim 29 said conducting device further comprises at least one second radial groove formed in an axial end surface of said second annular step facing said second annular race.

31. The scroll-type fluid displacement apparatus of claim 30 wherein said at least one second radial groove extends across the width of said second annular step.

32. The scroll-type fluid displacement apparatus of claim 31 wherein said first radial grooves are spaced from one another at equiangular intervals.

33. The scroll-type fluid displacement apparatus of claim 32 wherein each of said radial grooves has a rectangular cross-section.

34. The scroll-type fluid displacement apparatus of claim 32 wherein each of said radial grooves has a triangular cross-section.

35. The scroll-type fluid displacement apparatus of claim 32 wherein each of said radial grooves has a semicircular cross-section.

36. The scroll-type fluid displacement apparatus of claim 29 wherein said at least one first radial groove extends across the width of said first annular step.

37. The scroll-type fluid displacement apparatus of claim 36 wherein said second radial grooves are spaced from one another at equiangular intervals.

38. A scroll-type fluid displacement apparatus which comprises a housing; a fixed scroll attached to said housing and having a first end plate from which a first spiral element extends into said housing; an orbiting scroll having a second end plate from which a second spiral element extends, said first and second spiral elements interfitting at an angular and radial offset to create a plurality of line contacts to define at least one pair of sealed off fluid pockets and a driving mechanism operatively connected to said orbiting scroll to produce orbital motion of said orbiting scroll; a rotation preventing device for preventing rotation of said orbiting scroll and for bearing axial thrust load from said orbiting scroll during orbital motion, so that the volume of said fluid pockets changes, said rotation preventing and thrust bearing device disposed between said second end plate and said housing and comprised of an orbital portion, a fixed portion, and bearing elements coupled between said portions, said fixed portion including a first annular race having an outer diameter and a first ring, said first annular race placed within a first annular step which has an inner diameter and is formed in said housing, such that said first annular race's outer diameter is less than said first annular step's inner diameter, said first ring being attached to said housing to overlap said first annular race, said first ring having a plurality of first pockets extending axially and facing said first annular race and formed separately from said first annular race, said orbital portion including a second annular race having an outer diameter and a second ring, said second annular race placed within a second annular step which has an inner diameter and is formed in said second end plate, such that said second annular race's inner diameter is greater than said second annular step's outer diameter, said second ring being attached to said second end plate to overlap said second annular race and facing said first ring, said second ring having a plurality of second pockets extending axially and facing said second annular race and formed separately from said second annular race, a clearance being maintained between said first ring of said fixed portion and said second ring of said orbital portion, each of said bearing elements being carried within a substantially aligned pair of said first and second pockets and contacting said second and first annular races to prevent rotation of said orbiting scroll by said bearing elements interacting with said second and first rings and to bear the axial thrust load from said orbiting scroll on said first race through said bearing elements, first contacting surfaces between said first annular race and said first annular step, second contacting surfaces between said second annular race and said second annular step; and a conducting device for conducting a lubricant in said housing to at least one of said first and second contacting surfaces;

wherein said conducting device comprises at least one annular groove formed in an axial end surface of said first annular step and facing said first annular race.

* * * * *